United States Patent
Garin et al.

(10) Patent No.: US 8,116,976 B2
(45) Date of Patent: *Feb. 14, 2012

(54) SATELLITE BASED POSITIONING METHOD AND SYSTEM FOR COARSE LOCATION POSITIONING

(75) Inventors: Lionel J. Garin, Palo Alto, CA (US); Kurt C. Schmidt, Chapel Hill, NC (US)

(73) Assignee: CSR Technology Inc., San Jose, CA (US)

( * ) Notice: Subject to any disclaimer, the term of this patent is extended or adjusted under 35 U.S.C. 154(b) by 1064 days.

This patent is subject to a terminal disclaimer.

(21) Appl. No.: 11/835,300

(22) Filed: Aug. 7, 2007

(65) Prior Publication Data

US 2008/0147324 A1    Jun. 19, 2008

Related U.S. Application Data

(63) Continuation of application No. 10/700,821, filed on Nov. 4, 2003, now Pat. No. 7,263,440.

(51) Int. Cl.
*H04B 7/185*    (2006.01)

(52) U.S. Cl. ............. 701/213; 342/357.21; 342/357.66; 342/358

(58) Field of Classification Search .................. 701/213, 701/214, 215; 342/357.09, 357.12, 357.15, 342/357.03, 357.3, 357.2, 357.23, 357.21, 342/357.66, 358; 455/456.6; *G01C 21/00; H04B 7/185*
See application file for complete search history.

(56) References Cited

U.S. PATENT DOCUMENTS

| | | |
|---|---|---|
| 4,426,712 A | 1/1984 | Gorski-Popiel |
| 4,445,118 A | 4/1984 | Taylor et al. |
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |
| 4,785,463 A | 11/1988 | Janc et al. |
| 4,809,005 A | 2/1989 | Counselman, III |
| 4,821,294 A | 4/1989 | Thomas, Jr. |
| 4,884,041 A | 11/1989 | Walker |
| 4,890,233 A | 12/1989 | Ando et al. |
| 4,894,662 A | 1/1990 | Counselman |
| 4,998,111 A | 3/1991 | Ma et al. |
| 5,014,066 A | 5/1991 | Counselman, III |

(Continued)

FOREIGN PATENT DOCUMENTS

EP    0 511 741    11/1992

(Continued)

OTHER PUBLICATIONS

Marketing Material: Qualcomm CDMA Technologies—Integrated Solutions—MGP6200™ Multimode GPS Processor (8 pages).

(Continued)

*Primary Examiner* — Tuan C. To

(74) *Attorney, Agent, or Firm* — RatnerPrestia

(57) ABSTRACT

A satellite based positioning method and system including storing satellite sub-almanac data on a mobile station. Embodiments include using the sub-almanac data to take measurements and calculate a coarse position of the mobile station. Embodiments further include a location server calculating a correction to the coarse position, and the location server determining whether any sub-almanacs used to calculate the coarse position require replacement.

30 Claims, 9 Drawing Sheets

U.S. PATENT DOCUMENTS

| | | | |
|---|---|---|---|
| 5,036,329 A | 7/1991 | Ando | |
| 5,043,736 A | 8/1991 | Darnell et al. | |
| 5,108,334 A | 4/1992 | Eschenbach et al. | |
| 5,172,076 A | 12/1992 | Brown | |
| 5,202,829 A | 4/1993 | Geier | |
| 5,225,842 A | 7/1993 | Brown et al. | |
| 5,293,170 A | 3/1994 | Lorenz et al. | |
| 5,311,195 A | 5/1994 | Mathis et al. | |
| 5,323,164 A | 6/1994 | Endo | |
| 5,343,209 A | 8/1994 | Sennott et al. | |
| 5,345,244 A | 9/1994 | Gildea et al. | |
| 5,347,536 A | 9/1994 | Meechan | |
| 5,373,298 A * | 12/1994 | Karouby | 342/357.22 |
| 5,379,224 A | 1/1995 | Brown et al. | |
| 5,402,347 A | 3/1995 | McBurney et al. | |
| 5,416,712 A | 5/1995 | Geier et al. | |
| 5,418,538 A | 5/1995 | Lau | |
| 5,420,592 A | 5/1995 | Johnson | |
| 5,420,593 A | 5/1995 | Niles | |
| 5,440,313 A | 8/1995 | Osterdock et al. | |
| 5,450,344 A | 9/1995 | Woo et al. | |
| 5,489,878 A | 2/1996 | Gilbert | |
| 5,504,684 A | 4/1996 | Lau et al. | |
| 5,548,553 A | 8/1996 | Cooper et al. | |
| 5,592,173 A | 1/1997 | Lau et al. | |
| 5,623,414 A | 4/1997 | Misra | |
| 5,625,668 A | 4/1997 | Loomis et al. | |
| 5,635,879 A | 6/1997 | Sutardja et al. | |
| 5,663,734 A | 9/1997 | Krasner | |
| 5,663,735 A | 9/1997 | Eshenbach | |
| 5,764,184 A | 6/1998 | Hatch et al. | |
| 5,781,156 A | 7/1998 | Krasner | |
| 5,786,789 A | 7/1998 | Janky | |
| 5,796,662 A | 8/1998 | Kalter et al. | |
| 5,812,087 A | 9/1998 | Krasner | |
| 5,825,327 A | 10/1998 | Krasner | |
| 5,828,694 A | 10/1998 | Schipper | |
| 5,831,574 A | 11/1998 | Krasner | |
| 5,841,396 A | 11/1998 | Krasner | |
| 5,845,203 A | 12/1998 | LaDue | |
| 5,854,605 A | 12/1998 | Gildea | |
| 5,874,914 A | 2/1999 | Krasner | |
| 5,877,724 A | 3/1999 | Davis | |
| 5,877,725 A | 3/1999 | Kalafus | |
| 5,883,594 A | 3/1999 | Lau | |
| 5,884,214 A | 3/1999 | Krasner | |
| 5,889,474 A | 3/1999 | LaDue | |
| 5,889,492 A | 3/1999 | Kurby et al. | |
| 5,897,605 A | 4/1999 | Kohli et al. | |
| 5,901,171 A | 5/1999 | Kohli et al. | |
| 5,903,654 A | 5/1999 | Milton et al. | |
| 5,907,809 A | 5/1999 | Molnar et al. | |
| 5,917,383 A | 6/1999 | Tso et al. | |
| 5,917,444 A | 6/1999 | Loomis et al. | |
| 5,920,283 A | 7/1999 | Shaheen et al. | |
| 5,923,703 A | 7/1999 | Pon et al. | |
| 5,926,131 A | 7/1999 | Sakumoto et al. | |
| 5,936,572 A | 8/1999 | Loomis et al. | |
| 5,943,363 A | 8/1999 | Hanson et al. | |
| 5,945,944 A | 8/1999 | Krasner | |
| 5,963,582 A | 10/1999 | Stansell, Jr. | |
| 5,977,909 A | 11/1999 | Harrison et al. | |
| 5,982,324 A | 11/1999 | Watters et al. | |
| 5,983,109 A | 11/1999 | Montoya | |
| 5,987,016 A | 11/1999 | He | |
| 5,999,124 A | 12/1999 | Sheynblat | |
| 5,999,125 A | 12/1999 | Kurby | |
| 6,002,362 A | 12/1999 | Gudat | |
| 6,002,363 A | 12/1999 | Krasner | |
| 6,011,509 A | 1/2000 | Dutka | |
| 6,014,101 A | 1/2000 | Loomis | |
| 6,016,119 A | 1/2000 | Krasner | |
| 6,041,222 A | 3/2000 | Horton et al. | |
| 6,047,017 A | 4/2000 | Cahn et al. | |
| 6,052,081 A | 4/2000 | Krasner | |
| 6,058,338 A * | 5/2000 | Agashe et al. | 701/13 |
| 6,061,018 A | 5/2000 | Sheynblat | |
| 6,064,336 A | 5/2000 | Krasner | |
| 6,067,045 A | 5/2000 | Castelloe et al. | |
| 6,104,338 A | 8/2000 | Krasner | |
| 6,104,340 A | 8/2000 | Krasner | |
| 6,107,960 A | 8/2000 | Krasner | |
| 6,111,540 A | 8/2000 | Krasner | |
| 6,131,067 A | 10/2000 | Girerd | |
| 6,133,871 A | 10/2000 | Krasner | |
| 6,133,873 A | 10/2000 | Krasner | |
| 6,133,874 A | 10/2000 | Krasner | |
| 6,134,483 A | 10/2000 | Vayanos et al. | |
| 6,150,980 A | 11/2000 | Krasner | |
| 6,185,427 B1 | 2/2001 | Krasner | |
| 6,188,351 B1 | 2/2001 | Bloebaum | |
| 6,198,432 B1 * | 3/2001 | Janky | 342/357.31 |
| 6,204,808 B1 * | 3/2001 | Bloebaum et al. | 342/357.42 |
| 6,208,290 B1 | 3/2001 | Krasner | |
| 6,208,291 B1 | 3/2001 | Krasner | |
| 6,211,817 B1 * | 4/2001 | Eschenbach | 342/357.03 |
| 6,211,819 B1 | 4/2001 | King et al. | |
| 6,215,441 B1 | 4/2001 | Moeglein | |
| 6,215,442 B1 | 4/2001 | Sheynblat | |
| 6,222,483 B1 | 4/2001 | Twitchell et al. | |
| 6,229,478 B1 | 5/2001 | Biacs et al. | |
| 6,236,354 B1 | 5/2001 | Krasner | |
| 6,239,742 B1 | 5/2001 | Krasner | |
| 6,259,399 B1 | 7/2001 | Krasner | |
| 6,272,430 B1 | 8/2001 | Krasner | |
| 6,289,041 B1 | 9/2001 | Krasner | |
| 6,307,504 B1 | 10/2001 | Sheynblat | |
| 6,313,786 B1 | 11/2001 | Sheynblat | |
| 6,314,308 B1 | 11/2001 | Sheynblat | |
| 6,373,429 B1 | 4/2002 | Eschenbach | |
| 6,377,209 B1 | 4/2002 | Krasner | |
| 6,408,186 B1 * | 6/2002 | Park et al. | 455/456.1 |
| 6,408,196 B2 | 6/2002 | Sheynblat | |
| 6,411,254 B1 | 6/2002 | Moeglein | |
| 6,411,811 B2 | 6/2002 | Kingdon et al. | |
| 6,411,892 B1 | 6/2002 | Van Diggelen | |
| 6,417,801 B1 | 7/2002 | Van Diggelen | |
| 6,421,002 B2 | 7/2002 | Krasner | |
| 6,429,809 B1 | 8/2002 | Vayanos et al. | |
| 6,429,814 B1 | 8/2002 | Van Diggelen et al. | |
| 6,433,731 B1 | 8/2002 | Sheynblat | |
| 6,453,237 B1 * | 9/2002 | Fuchs et al. | 701/213 |
| 6,462,708 B1 | 10/2002 | Tsujimoto et al. | |
| 6,484,097 B2 | 11/2002 | Fuchs et al. | |
| 6,487,499 B1 | 11/2002 | Fuchs et al. | |
| 6,510,387 B2 | 1/2003 | Fuchs et al. | |
| 6,535,815 B2 | 3/2003 | Bloebaum | |
| 6,542,821 B2 | 4/2003 | Krasner | |
| 6,559,793 B1 | 5/2003 | Eschenbach | |
| 6,570,530 B2 | 5/2003 | Gaal et al. | |
| 6,583,757 B2 | 6/2003 | Krasner | |
| 6,597,311 B2 | 7/2003 | Sheynblat | |
| 6,608,589 B1 * | 8/2003 | Devereux et al. | 342/357.29 |
| 6,671,620 B1 | 12/2003 | Garin et al. | |
| 6,778,885 B2 | 8/2004 | Agashe et al. | |
| 7,263,440 B2 * | 8/2007 | Garin et al. | 701/213 |
| 7,904,243 B2 * | 3/2011 | Cohen et al. | 701/214 |
| 2002/0072854 A1 | 6/2002 | Fuchs et al. | |
| 2002/0186165 A1 | 12/2002 | Eschenbach | |
| 2003/0016170 A1 | 1/2003 | Jandrell | |
| 2003/0112176 A1 | 6/2003 | Vayanos et al. | |
| 2003/0212487 A1 | 11/2003 | Dooley et al. | |
| 2004/0263386 A1 | 12/2004 | King et al. | |
| 2006/0181452 A1 | 8/2006 | King et al. | |

FOREIGN PATENT DOCUMENTS

| | | |
|---|---|---|
| GB | 2 115 195 | 1/1983 |
| JP | 58-105632 | 6/1983 |
| JP | 7-36035 | 5/1986 |
| JP | 4-326079 | 11/1992 |
| JP | 10048316 A * | 2/1998 |
| JP | 10260242 A * | 9/1998 |
| JP | 2000046923 A * | 2/2000 |
| WO | WO90/11652 | 10/1990 |

OTHER PUBLICATIONS

Marketing Material: uNav Microelectronics—uN9x18 Low Power, High Performance GPS Receiver Chipset/uN9x18 GPS Receiver Solution (9 pages).
Marketing Material: uNav Microelectronics, uN9x18 Low Power, High Performance GPS Receiver Chipset (2 pages).
Marketing Material: Global Locate—Hammerhead II™, Single Chip AGPS Solution (2 pages).
Marketing Material/Press Release: Broadcom Introduces Advanced Single-Chip GPS Solution for Mobile Applications (3 pages).
Marketing Material/White Paper: SnapTrack: A Qualcomm Company—SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages).

* cited by examiner

SATELLITE BASED POSITIONING METHOD AND SYSTEM FOR COARSE LOCATION POSITIONING

RELATED APPLICATIONS

This patent application is a continuation-in-part of U.S. patent application Ser. No. 09/575,492, filed May 18, 2000, entitled Method and Apparatus for Determining Global Position Using Almanac Information, which is hereby incorporated by reference in its entirety.

FIELD OF INVENTION

The invention relates to satellite based positioning methods and systems, and more particularly, to using stored Global Positioning System (GPS) satellite almanac information to determine the coarse position of a mobile station.

BACKGROUND

Satellite based positioning systems include networks of earth orbiting satellites that constantly transmit geographical position information to receivers. An example of a satellite based positioning system is the Global Positioning System (GPS), which includes a network of earth orbiting satellites (GPS satellites or satellite vehicles). A GPS receiver can be in a fixed position on a base station or location server, or the receiver can be on a mobile unit or station. The GPS receiver and known processing hardware and software are used to receive GPS data from GPS satellites and determine the position of the receiver. GPS technology was first used in military and emergency service applications. As GPS technology becomes more economical and compact, however, it is becoming ever more common in consumer applications. For example, many location based services (LBS) now exist, such as asset tracking, turn-by-turn routing, and friend finding.

The wireless community is investigating procedures and methodologies for LBS that most benefit both the consumer and the provider. The change in focus from emergency to commercial services is characterized by an increased number of users, an increased number of positioning requests per user, and an increase in the accuracy needed to meet various LBS quality of service requirements. As the demand for LBS capabilities grows, the number of users taking advantage of those services will potentially outstrip those transmitting requests for emergency services. Additionally, a number of these services (turn-by-turn routing, for example) involve each user requiring repeated location solutions, which is in contrast to the single position request that characterizes an emergency call. Finally, many of the LBS that are being planned require accuracies far greater than those required for regulatory compliance.

The diversity inherent in proposed LBS offerings presents LBS providers with many choices and challenges. For example, some LBS work better with a mobile station (MS) based approach while others are better served by an MS-assisted solution.

It is desirable to have a satellite based positioning method and system that is able to handle greatly increased LBS system usage while allowing a system operator the flexibility to choose between MS based, MS-assisted, or other approaches. It is further desirable to have a satellite based positioning method and system with the high accuracy required by most LBS. It is desirable to have a satellite based positioning method and system that minimizes the use of network resources while also minimizing the power used by mobile stations.

BRIEF DESCRIPTION OF THE DRAWINGS

The following figures are provided to assist in describing embodiments of the invention, and are not intended to be exclusive or limiting. In the figures, like reference numerals designate like elements.

DETAILED DESCRIPTION

Figure 1:
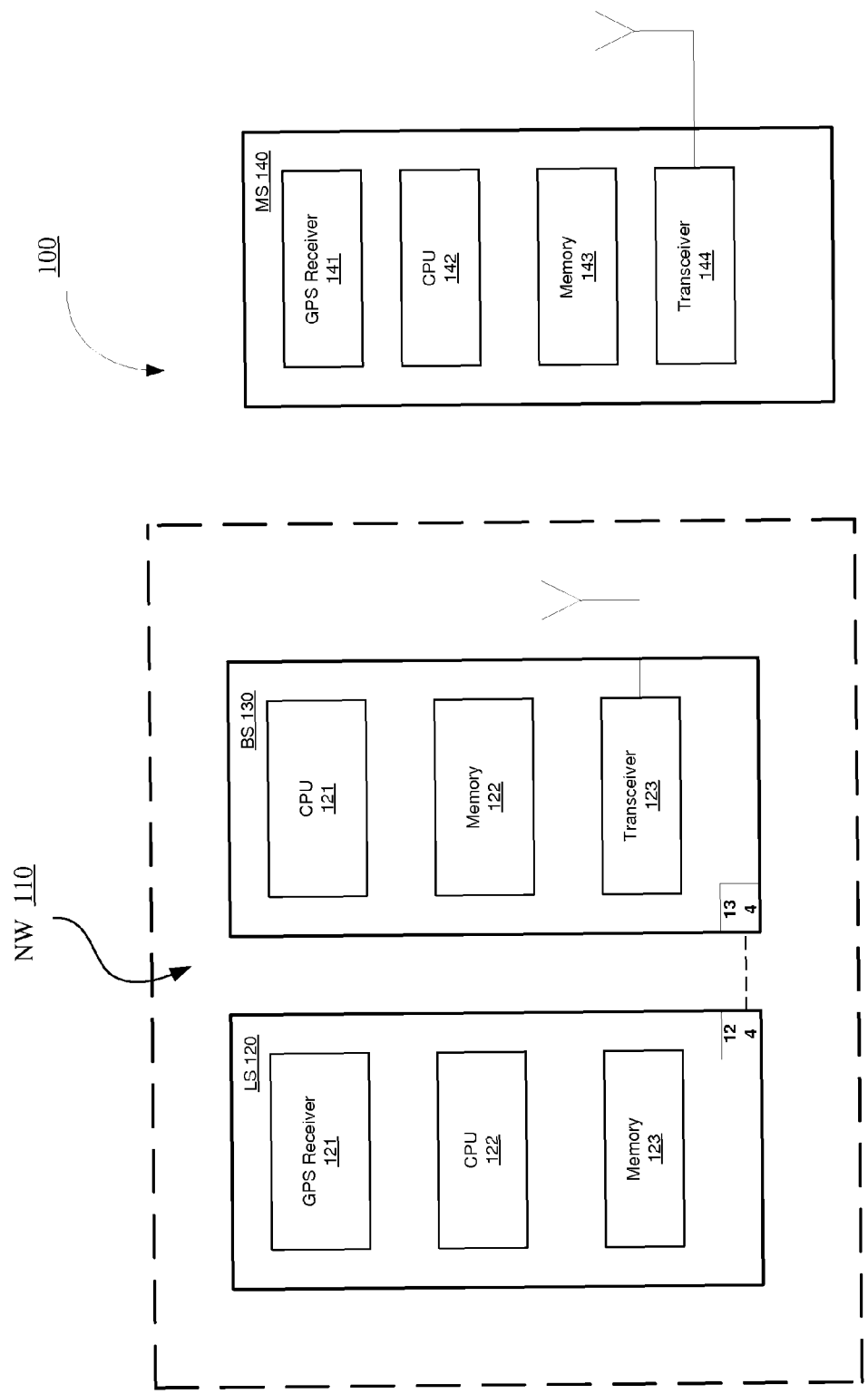
FIG. 1 is a block diagram of an embodiment of a satellite based positioning system.

Embodiments of the invention allow system operators providing LBS to flexibly perform position fixes using various combinations of network resources and mobile station resources. Embodiments of the invention allow system operators to provide LBS to large numbers of subscribers with high accuracy within acceptable time frames.

Embodiments of the invention allow coarse positioning by a mobile station in a satellite based positioning systems, such as the GPS system. Embodiments of the invention provide traditional GPS accuracies while dramatically reducing the bandwidth consumed by similar methods and their required assistance data payloads. Embodiments of coarse location positioning described herein require a minimum amount of transmitted assistance data. While some MS-assisted, techniques rely on acquisition aiding information with a usable lifespan measured in minutes, or on ephemeris data with a lifespan measured in hours, coarse location positioning methods described herein use satellite sub-almanacs that remain usable for many weeks. An almanac is a list of Kepler parameters, e.g., orbit and clock parameters, for all of the satellites operating in the GPS constellation. A sub-almanac contains only the orbit and clock parameters for one satellite.

Complete GPS almanac information is assembled from data broadcast by each satellite in a twelve-second message every thirst seconds, for a total time of twelve minutes. A sub-almanac can be retrieved by receiving any twelve-second message within the twelve minute broadcast. Each sub-almanac is identified by a unique sub-almanac identification. The Kepler parameters are typically not considered accurate enough to be used for precise positioning calculations.

Each satellite continuously transmits its own ephemeris data. Ephemeris data contains satellite position information that is accurate to within five to ten meters of the actual satellite actual location. However, the ephemeris data is only valid for about four hours. The ephemeris data is broadcast from each satellite for eighteen seconds each thirty-second period.

Embodiments described herein allow mobile stations to perform "off-line" processing in which a mobile GPS receiver that has no communication with a network even for several days, can calculate its own coarse position using stored almanac data. This allows the use of significantly less power than conventional methods. The mobile station can communicate the coarse position, and identifications of sub-almanacs used in the coarse position calculation, to a server on the network when communication is restored. At that time, corrections to the position can be made with the help of the network server. In various embodiments, corrections to the position are made at the pseudorange level or at the three-dimensional position vector level with a three-dimensional position correction vector. For example, the corrections can be calculated as a pseudorange correction per satellite. In this case, the sub-almanac based pseudoranges are extracted back from the coarse position, and the pseudorange corrections are applied before recomputing a position with the ephemeris and with accurate time. In another example, the corrections are calculated as a position vector that is calculated over the same satellites used to compute the coarse position.

FIG. 1 is a block diagram of a GPS system 100. The system 100 includes a mobile station 140 (MS) that communicates with a network 110. The network 110, in one embodiment, includes a portable or fixed base station (BS) 130, and a portable or fixed location server 120. The location server 120 acts as a data server to the BS 130, which in tarn communicates with the MS 140. The location server 120 has access to GPS data from satellites in view. Typically the location server 120 stores the current ephemeris and almanac data for at least the satellites in view. In the embodiment shown, the location server 120 includes a GPS receiver 121 for receiving the GPS data directly. In other embodiments, the location server does not include a GPS receiver, but receives the GPS data transmitted from another component that has a GPS receiver. The location server 120 further includes a central processing unit (CPU) 122, a memory device 123, and a communications channel interface 124. The communications channel can include any type of communications channel, such as wired or wireless.

BS 130 includes a central processing unit (CPU) 131, a memory device 132, a wireless transceiver 133, and a communications channel interface 134.

The MS 140 includes a GPS receiver 141, a CPU 142, a, memory device 143 and a wireless transceiver 44. The MS 140 has sub-almanac data stored in the memory 143, although the data may not be a complete almanac.

In other embodiments, the BS 130 also includes GPS capability. Alternatively, complete GPS capability and all of the capability necessary to communicate with the MS 140 is collocated. In general, the MS 140 communicates with some configuration of components on the network 110. The network 110 provides LBS such as asset tracking, in which mobile assets (e.g., taxi cabs) are mobile stations with GPS receivers.

Figure 2:
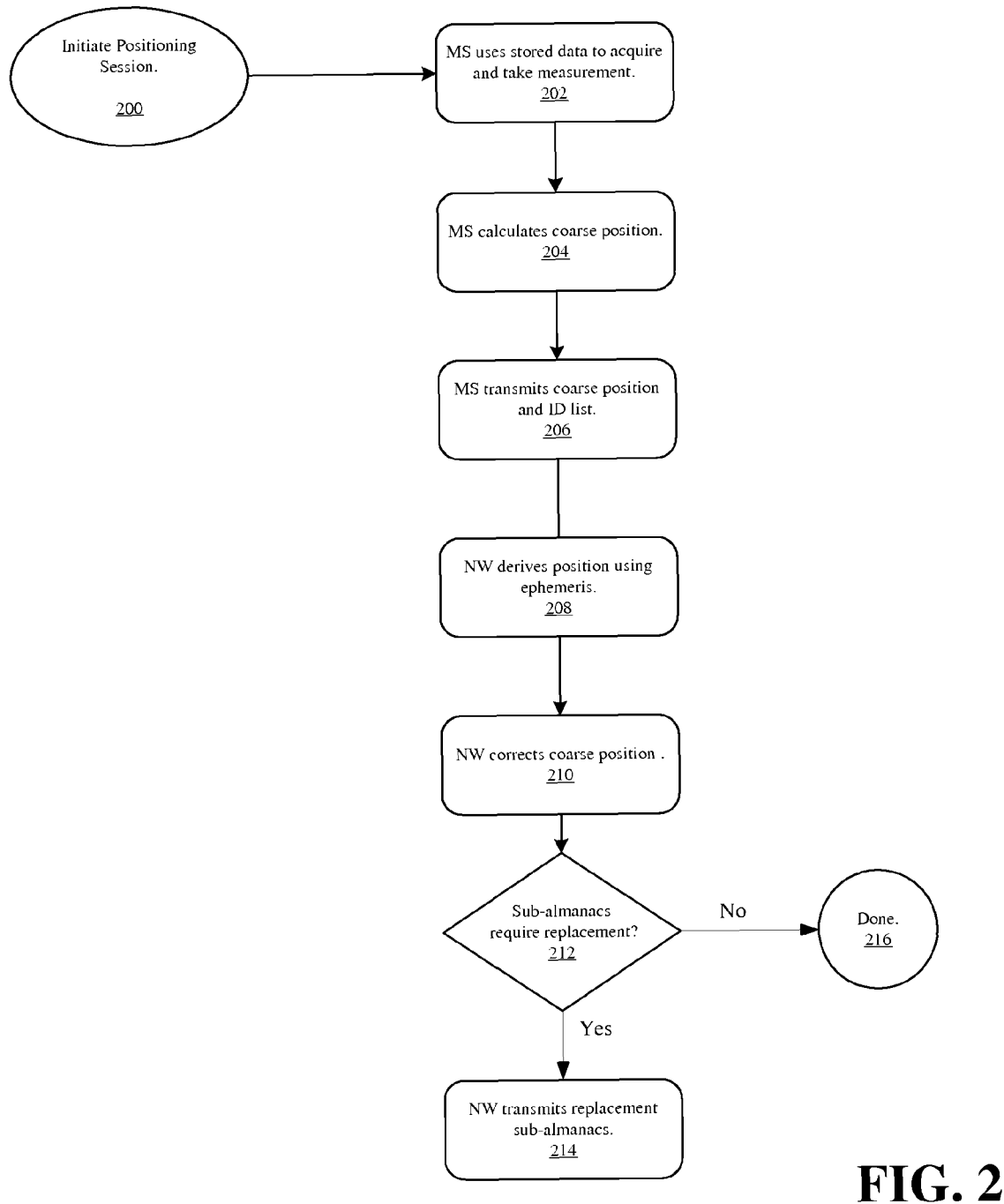
FIG. 2 is a flow diagram of a general embodiment of a coarse location positioning method.

Embodiments of the invention reduce the time to first fix (TTFF) for a GPS mobile station receiver while using minimal power, in part by using GPS sub-almanac data stored on, or sent to, the mobile station to calculate its own coarse position. FIG. 2 is a flow diagram illustrating a general method according to one embodiment. At 200, a coarse positioning session is initiated. The coarse positioning session can be initiated by the MS itself, or the MS may receive a signal initiating the session, such as a positioning request sent or forwarded by the position server or BS. Optionally, the network also transmits a reference position that includes latitude, longitude, and time. The reference position is a precise position of a location that is close enough to the mobile station to be helpful to the mobile station in as an indication of which satellites should be in view and in finding an initial position solution.

At 202, the MS uses stored sub-almanac data along with a reference position (if received) and time estimates, to acquire satellites and take measurements. Taking measurements includes, for example, determining a approximate distance of the mobile station from a particular satellite with some error attributable to time differences. The MS, at 204, uses the measurements, and a satellite position as derived from the sub-almanacs, to calculate a coarse position. At 206, the MS transmits the coarse position to the network along with a list that identifies the particular satellites used in the solution, and the particular sub-almanacs used for each satellite. In some embodiments, the MS transmits a full coarse position. In other embodiments, the MS transmits a position difference between the reference position received from the network, and the coarse position.

At 208, the network derives satellite positions using the current ephemeris. The network then calculates the differences between almanac-derived and ephemeris-derived satellite positions and uses them to create a corrected position for the MS at 210. The network, in various embodiments, can calculate a coarse correction in various ways. For example, the correction can be a pseudo-range correction per satellite. In this case, the sub-almanac pseudoranges are extracted back from the coarse position, and the pseudorange corrections are applied before recomputing the position with the ephemeris, and with time. Alternatively, the coarse position correction can be calculated as a position correction vector that is calculated over the same satellites as those used by the MS to compute the coarse position. The coarse position correction may or may not include differential corrections in different embodiments, where differential corrections account for discrepancies between what the ephemeris predicts and what a reference receiver at a known location sees in the pseudoranges.

At 212, the network determines whether one or more of the sub-almanacs used by the MS contributed an unacceptable level of range error, due for example to the sub-almanacs being too old. If so, the network transmits the latest version of the particular error-causing sub-almanacs to the MS at 214.

A sub-almanac stored at the MS is only replaced when the error associated with the aging data exceeds a specified threshold. This corresponds to a useable life for a sub-almanac that is approximately three weeks to twenty weeks. In one embodiment, an indication of the acceptable level of error is transmitted from the MS to the network. The MS uses the sub-almanacs for both satellite acquisition and for calculating a coarse position.

In various embodiments, the order of the numbered process elements shown in all of the figures, including FIG. 1, may be changed. Alternatively, all of the numbered process elements shown may not be present in various embodiments. For example, in some embodiments, the mobile station may calculate and store a coarse position using stored sub-almanacs, even though the mobile station may not be in contact with the network for some period of time, such as several days. When network contact is restored, the mobile station can immediately transmit its coarse position.

Figure 3:
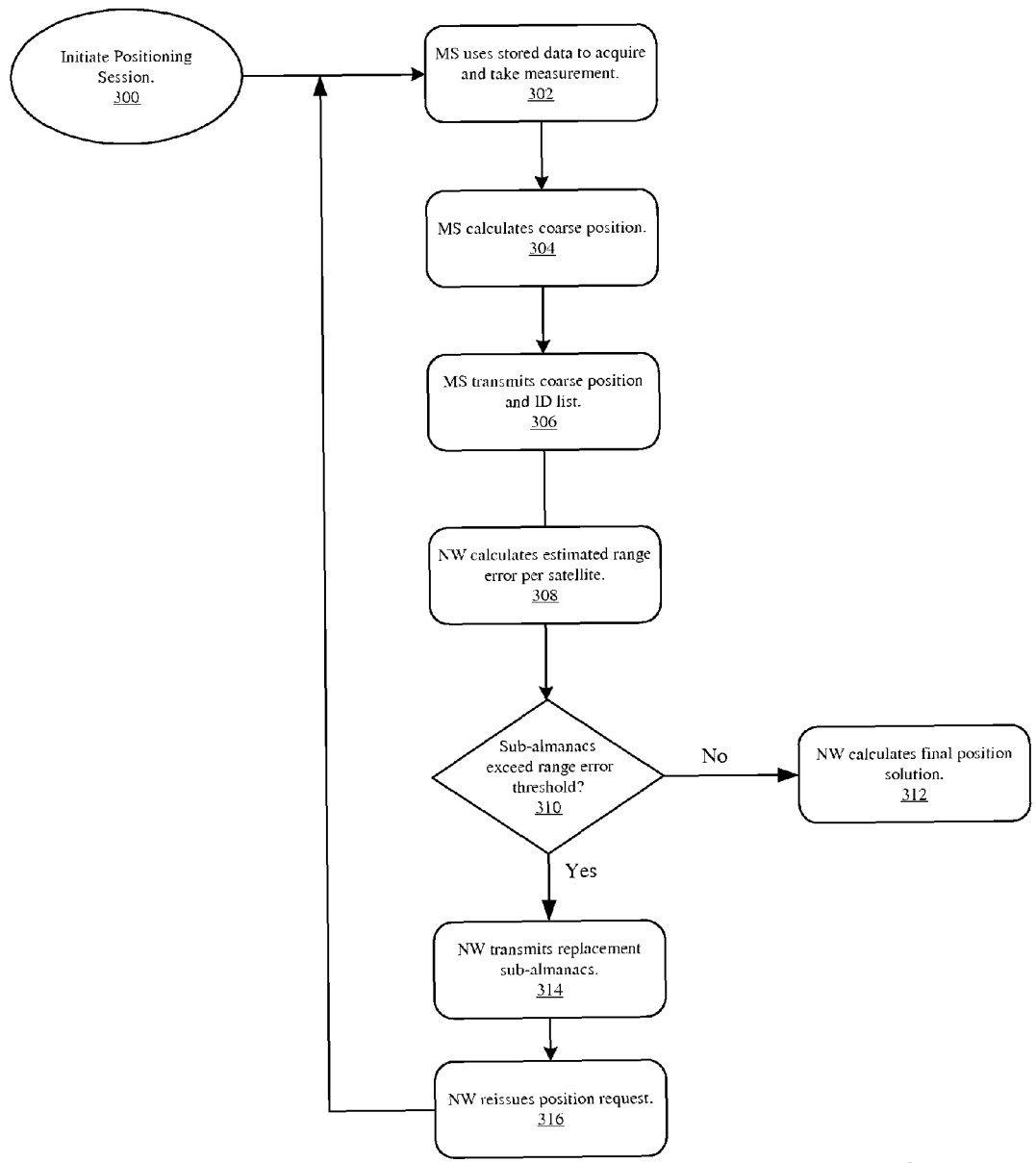
FIG. 3 is a flow diagram of another embodiment of a coarse location positioning method.

The coarse location positioning method illustrated in FIG. 2 may be applied using a variety of specific schemes. FIG. 3 is a flow diagram illustrating one embodiment of the coarse location positioning method.

At 300, a coarse positioning session is initiated. Optionally, the network also transmits a reference location that includes a latitude, longitude, and time. At 302, the MS uses stored almanac data along with its local position and time estimates, to acquire satellites and take measurements. The MS, at 304, uses the measurements, and satellite positions as derived from the sub-almanacs, to calculate a coarse position. At 306, the MS transmits the coarse position to the network along with a list that identifies the particular satellites used in the solution, and the particular sub-almanac used for each satellite.

At 308, the network calculates an estimated range error for each sub-almanac. At 310, the network determines whether any of the sub-almanacs used by the MS exceed the range error threshold. If none of the sub-almanacs used by the MS exceed the range error threshold, the network calculates the final position solution at 312. If one or more of the sub-almanacs used by the MS exceed the range error threshold, the network transmits replacement sub-almanacs for each of the sub-almanacs exceeding the range error threshold at 314. The network then reissues the position request at 316. In an LBS service characterized by repeated position requests, the single-request path (the path including block 312) is traversed in the vast majority of sessions.

Figure 4:
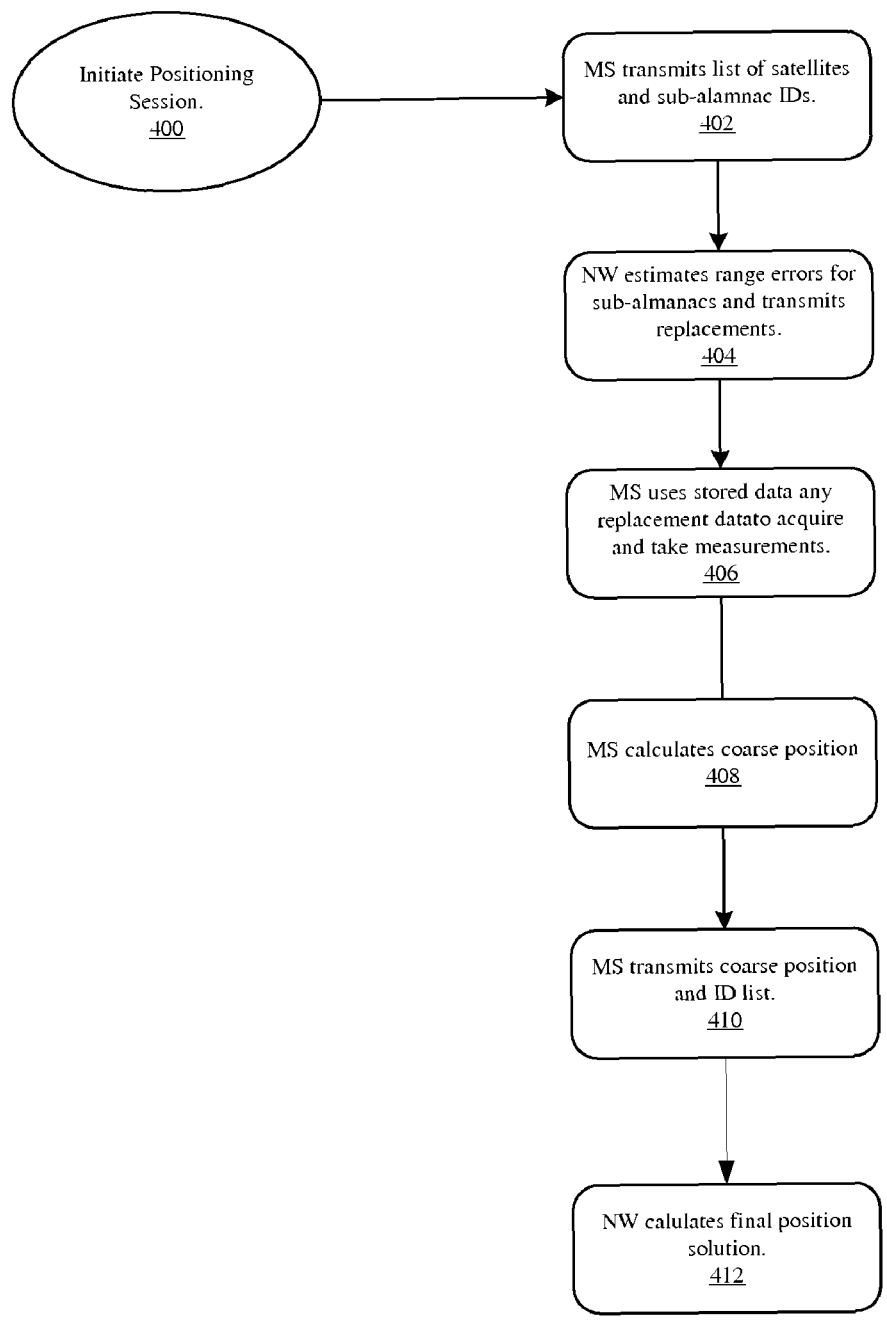
FIG. 4 is a flow diagram of another embodiment of a coarse location positioning method.

FIG. 4 is a flow diagram illustrating another embodiment of the coarse location positioning method. At 400, a coarse positioning session is initiated. Optionally, the network also transmits a reference location that includes a latitude, longitude, and time. Upon receipt of the position request, at 402, the MS transmits a list of the satellites it will track and the associated sub-almanac identifications to the network. At 404, the network calculates the estimated range errors for each sub-almanac and transmits replacement sub-almanacs for those exceeding the range error threshold. At 406, the MS uses its stored sub-almanacs, including any received replacement sub-almanacs, to acquire satellites and tale measurements. At 408, the MS calculates a coarse position using the sub-almanacs. At 410, the MS transmits the coarse position to the network along with a list of the satellites used in the solution and the associated sub-almanac identifications. The network calculates the final position solution at 412 from the information transmitted from the MS.

Figure 5:
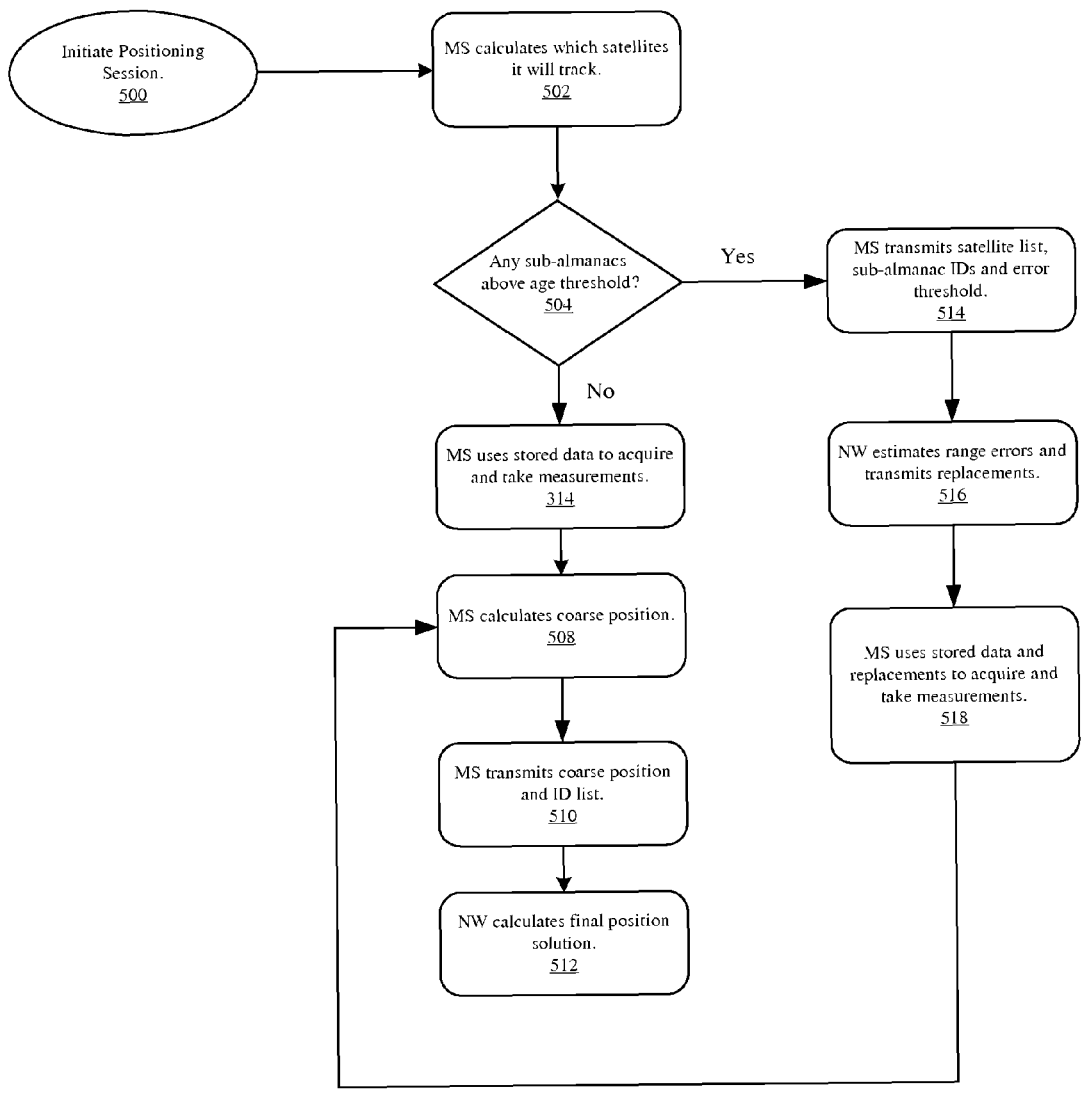
FIG. 5 is a flow diagram of another embodiment of a coarse location positioning method.

FIG. 5 is a flow diagram illustrating another embodiment of the coarse location positioning method. At 500, a coarse positioning session is initiated. At 502, the MS, upon receipt of a position request, calculates which satellites it will track. At 504, the MS examines the age of the sub-almanac data associated with each satellite in its proposed tracking list and determines whether the age of any of the sub-almanacs is above a value derived from the predetermined range error threshold. If none of the sub-almanac ages are above the value derived from the range error threshold, as shown at 506, the MS uses its stored sub-almanacs to acquire satellites and take measurements. At 508, the MS calculates a coarse position using the sub-almanacs. At 510, the MS transmits the coarse position to the network along with a list of the satellites used in the solution and the associated sub-almanac identifications. The network calculates the final position solution at 512 from the information transmitted from the MS.

If any sub-almanacs exceed an age threshold, as shown at 514, the MS transmits the list of the satellites it intends to track, the satellites' associated sub-almanac identifications, and the range error threshold to the network. At 516, the network calculates the estimated range errors for each sub-almanac and transmits replacement sub-almanacs for those exceeding the range error threshold. At 518, the MS uses the received replacement sub-almanacs, to acquire satellites and tale measurements. At 508, the MS calculates a coarse position using the sub-almanacs. At 510, the MS transmits the coarse position to the network along with a list of the satellites used in the solution and the associated sub-almanac identifications. The network calculates the final position solution at 512 from the information transmitted from the MS.

In one embodiment, the method for computing and correcting the coarse location includes the following equations.

The MS computes the coarse location using:

$$\Delta \hat{x}_A = (G_A^T R^{-1} G_A)^{-1} G_A^T R^{-1} \Delta \hat{\rho}_A \qquad \text{Equation 1}$$

With:

$$\Delta \hat{x}_A = \left[ \left( \hat{\bar{r}}_u - \bar{r}_u \right)^T \quad -c \cdot B_u \right]^T \qquad \text{Equations 2, 3, 4,}$$

$$G_A = \begin{bmatrix} -\hat{1}_{1A}^T & 1 \\ \vdots & \vdots \\ -\hat{1}_{nA}^T & 1 \end{bmatrix}$$

$$\hat{1}_{iA} = \frac{\bar{r}_{iA} - \hat{\bar{r}}_u}{\left| \bar{r}_{iA} - \hat{\bar{r}}_u \right|}$$

and $$\Delta \hat{\rho}_A = \begin{bmatrix} \Delta \hat{\rho}_{1A} \\ \vdots \\ \Delta \hat{\rho}_{nA} \end{bmatrix} \qquad \text{Equations 5, 6, and 7}$$

$$\Delta \hat{\rho}_{iA} = \hat{\rho}_{iA} - \rho_i$$

$$\hat{\rho}_{iA} = \hat{1}_{iA}^T \cdot \left[ \bar{r}_{iA} - \hat{\bar{r}}_u \right] - c \cdot B_{iA} + c \cdot B_u$$

Where:
$\bar{r}_u$=Reference location vector in ECEF coordinates (3×1)
$\bar{r}_u$=Receiver Location vector at reception time in ECEF coordinates (3×1)
c=Speed of light in vacuum
$\bar{r}_{iA}$=Almanac-predicted $i^{th}$ satellite location at transmit time in ECEF
$B_{iA}$=Almanac-predicted ith satellite clock bias
$\rho_i$=Measured pseudorange for ith satellite
R=Measurement weighting matrix (n×n)
$B_u$=Receiver clock bias
n=Number of satellites used in location solution
The BS corrects coarse location using:

$$\Delta \hat{x}_E \approx \Delta \hat{x}_A + P \cdot \Delta \hat{\rho} \qquad \text{Equation 8}$$

With $$\hat{\rho}_{iE} = \hat{1}_{iE}^T \cdot [\bar{r}_{iE} - \bar{r}_u] - c \cdot B_{iE} + c \cdot B_u \qquad \text{Equation 9}$$

$$\Delta \hat{\rho} = \hat{\rho}_{iE} - \hat{\rho}_{iA} \qquad \text{Equation 10}$$

$$\Delta \hat{x}_E = \left[ \left( \hat{\bar{r}}_u - \bar{r}_u \right)^T \quad -c \cdot B_u \right]^T \qquad \text{Equations 11, 12, 13}$$

$$P = (G_E^T R^{-1} G_E) G_E^T R^{-1}$$

$$G_E = \begin{bmatrix} -\hat{1}_{nE}^T & 1 \\ \vdots & \vdots \\ -\hat{1}_{nE}^T & 1 \end{bmatrix}$$

-continued $$\hat{1}_{iE} = \frac{\bar{r}_{iE} - \hat{r}_u}{|\bar{r}_{iE} - \hat{r}_u|} \quad \text{Equation 14}$$

where:

$\bar{r}_{iE}$=Ephemeris-predicted i$^{th}$ satellite position at transmit time (n×1)

$B_{iE}$=Ephemeris-predicted i$^{th}$ satellite clock bias

Simulations were run to evaluate the accuracy and the sub-almanac data transmission requirements of the coarse location positioning methods described herein. The simulations' were ran using archived sub-almanac and ephemeris data. The simulations were started with a random reference position 10 kilometers from the time position of the unit under test and an up-to-date almanac. Time was moved one week per iteration, and the initial almanac was used to calculate a coarse position at the MS. The coarse position and the sub-almanac identifications for the satellites used in the solution were made available to a simulated location server. The location server, using the ephemeris data appropriate for the simulated week, then calculated the corrected position. At each step, if a satellite's sub-almanac projected an out-of-tolerance range error, a sub-almanac current to that simulated week replaced that satellite's sub-almanac and the replacement was noted. The results of numerous simulations showed that over a 26 week time period, accuracies averaged between 15 and 25 meters. Over the 26 weeks in the simulation, between 6 and 12 satellites required a single sub-almanac replacement.

Results of two simulations are presented in the following figures. The results of one simulation are shown in FIGS. 6A-6H, which illustrate results of a simulation using a 20 kilometer range error replacement threshold.

Figure 6A:
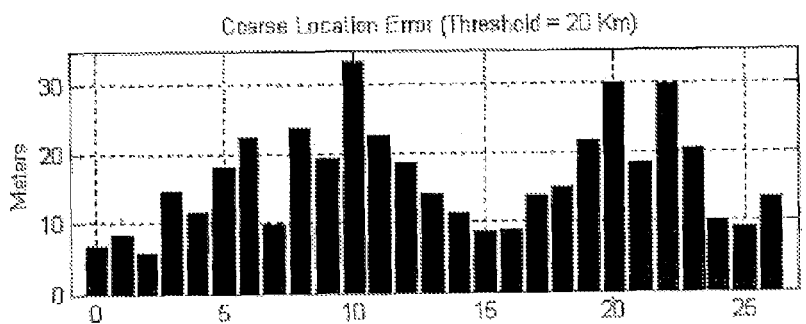
FIGS. 6A through 6H illustrate the results of one simulation of an embodiment.
Figure 6B:
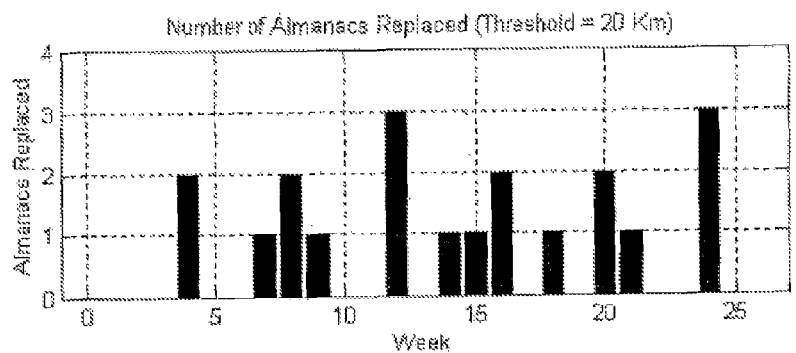
Figure 6C:
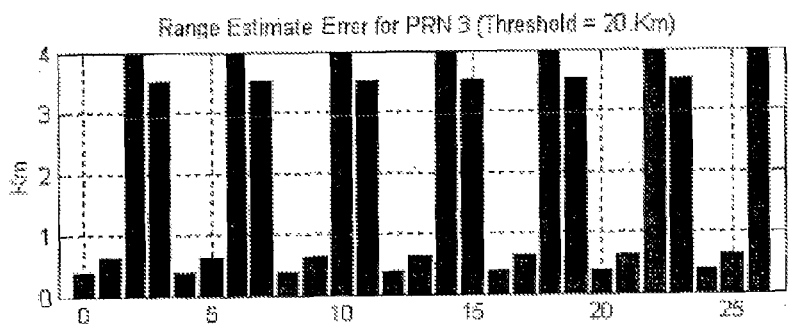
Figure 6D:
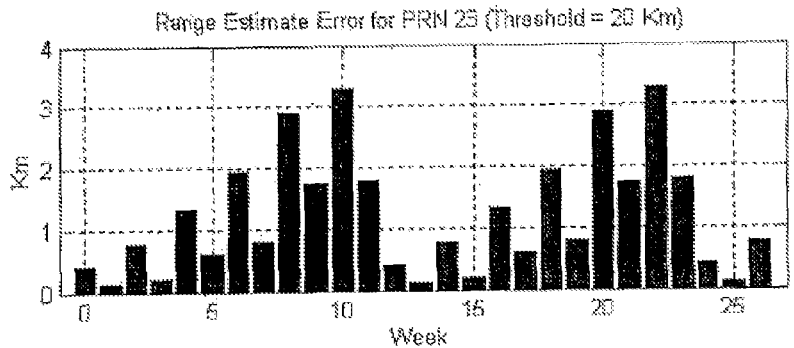
Figure 6E:
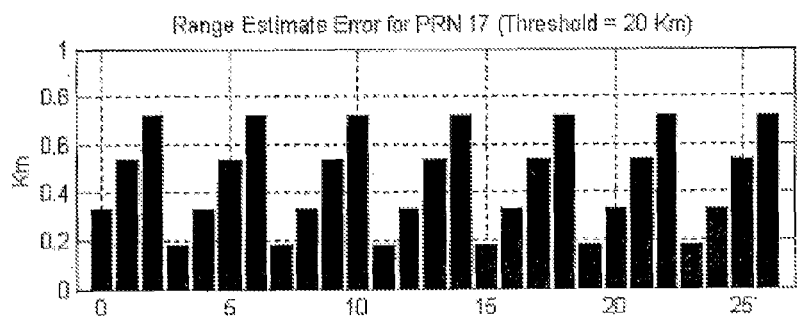
Figure 6F:
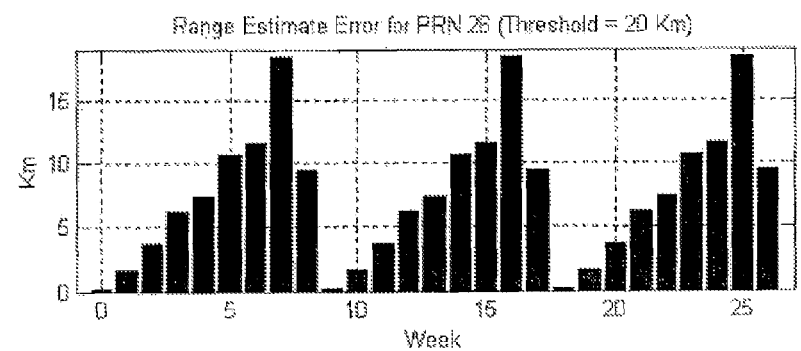
Figure 6G:
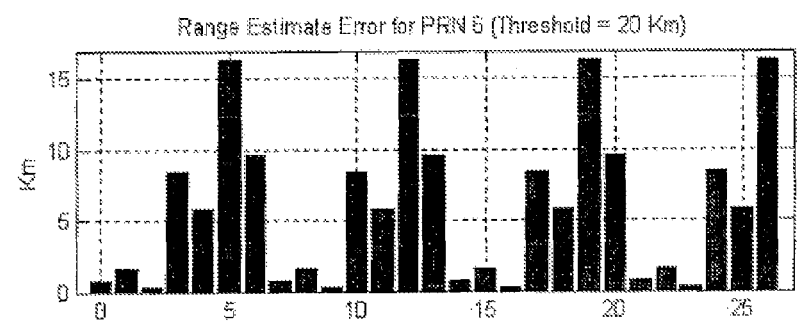
Figure 6H:
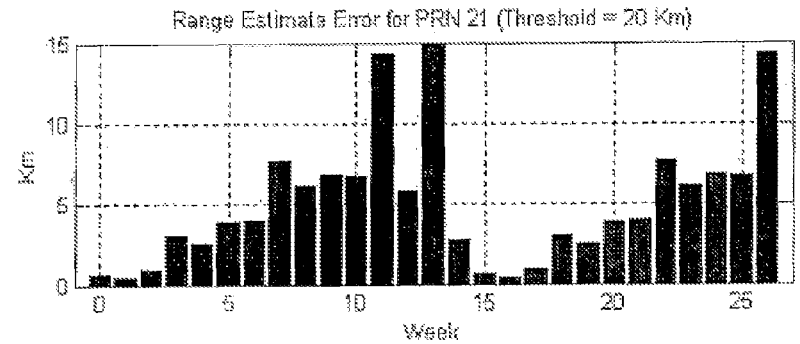

FIG. 6A illustrates calculated horizontal position error for the simulation. FIG. 6B illustrates the number of sub-almanacs that required replacement in the simulation. FIG. 6C shows the range error estimate for the satellite with the pseudorandom number code (PRN) 3. FIG. 6D shows the range error estimate for the satellite with the pseudorandom number code (PRN) 23. FIG. 6E shows the range error estimate for the satellite with the pseudorandom number code (PRN) 17. FIG. 6F shows the range error estimate for the satellite with the pseudorandom number code (PRN) 26. FIG. 6G shows the range error estimate for the satellite with the pseudorandom number code (PRN) 6. FIG. 6H, shows the range error estimate for the satellite with the pseudorandom number code (PRN) 21.

The results of another simulation are shown in FIGS. 7A-7H, which illustrate results of a simulation using a 50 kilometer range error replacement threshold.

Figure 7A:
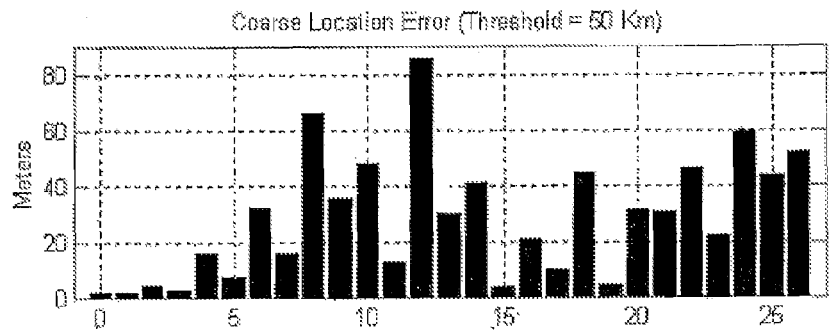
FIGS. 7A through 7H illustrate the results of another simulation of an embodiment.
Figure 7B:
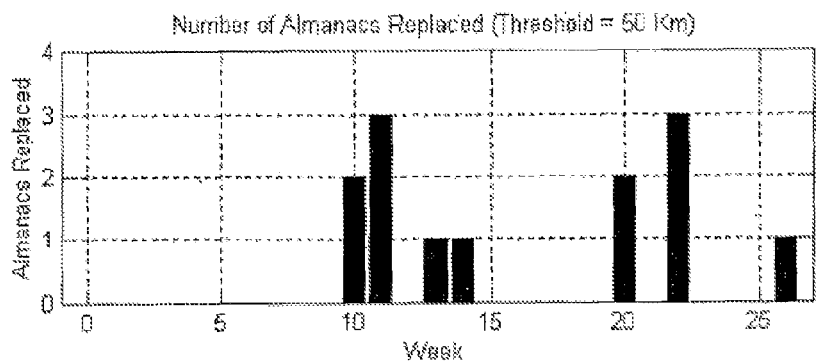
Figure 7C:
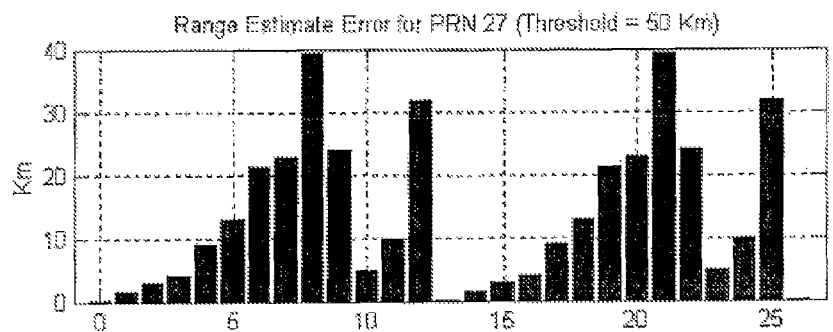
Figure 7D:
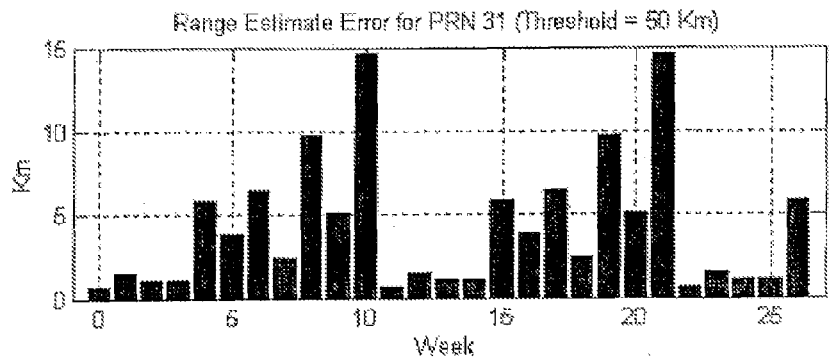
Figure 7E:
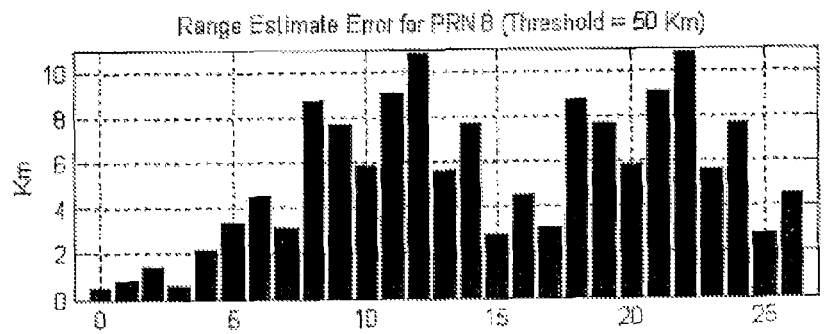
Figure 7F:
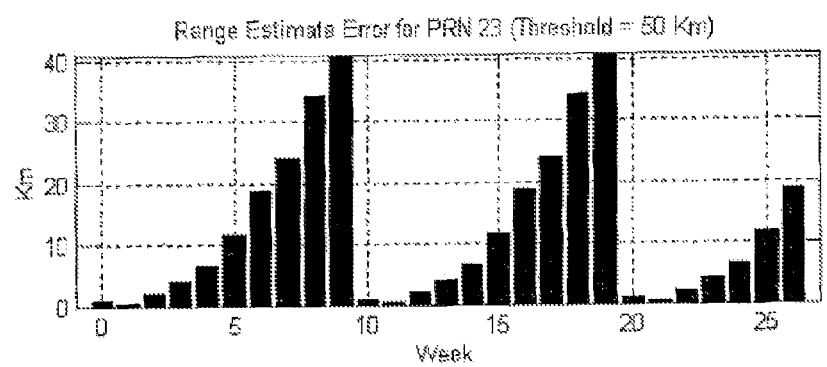
Figure 7G:
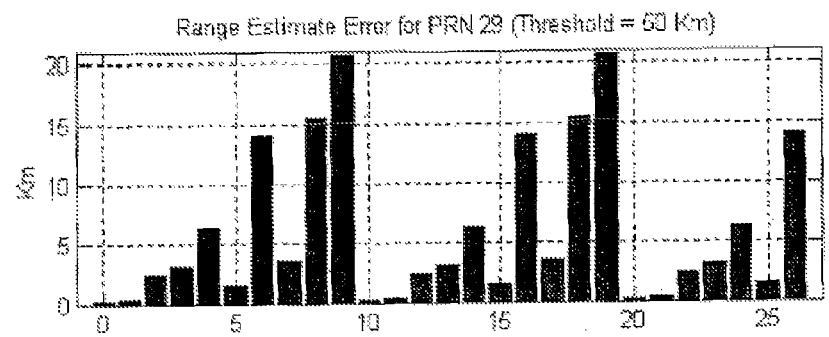
Figure 7H:
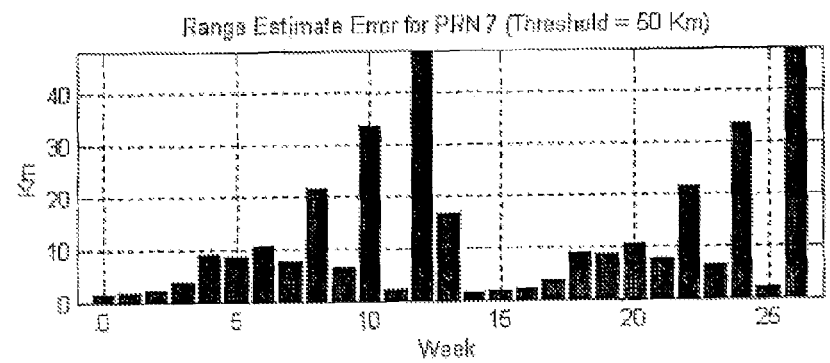

FIG. 7A illustrates calculated horizontal position error for the simulation. FIG. 7B illustrates the number of sub-almanacs that required replacement in the simulation. FIG. 7C shows the range error estimate for the satellite with the pseudorandom number code (PRN) 27. FIG. 7D shows the range error estimate for the satellite with the pseudorandom number code (PRN) 31. FIG. 7E shows the range error estimate for the satellite with the pseudorandom number code (PRN) 8. FIG. 7F shows the range error estimate for the satellite with the pseudorandom number code (PRN) 23. FIG. 7G shows the range error estimate for the satellite with the pseudorandom number code (PRN) 29. FIG. 7H shows the range error estimate for the satellite with the pseudorandom number code (PRN) 7.

To illustrate the downlink bandwidth savings using embodiments of coarse positioning as described herein when compared to a typical acquisition assistance method, two scenarios with their respective bit usages are provided below. Uplink messaging is comparable between the two techniques.

One scenario is turn-by-turn directions. The list below shows particulars used in the comparison between conventional acquisition assistance and coarse location positioning as described herein. Table 1 shows that a reduced number of assistance bits are required when using embodiments of coarse location positioning as described herein.

Number of users: 10

Average length of the session: 20 minutes

Usable age for acquisition assistance data: 4 minutes

For the coarse location positioning, assume each satellite gets a new sub-almanac during the session (very pessimistic; this would only occur if the user had not performed an LCS session during the previous 3 to 20 weeks)

The comparable downlink bandwidth used is:

TABLE 1

| Number of Satellites in the Solution | Total Assistance Bits Using Acquisition Assistance | Total Assistance Bits Using Coarse Location Positioning |
| --- | --- | --- |
| 4 | 12,550 | 7,660 |
| 6 | 18,150 | 11,420 |
| 8 | 23,750 | 15,180 |

Another scenario is asset tracking in which the assets are taxi cabs. The list below shows particulars used in the comparison between conventional acquisition assistance and coarse location positioning as described herein. Table 2 shows that a reduced number of assistance bits are required when using embodiments of coarse location positioning as described herein.

Number of taxis: 15

Average length of the shift: 8 hours

Usable age for acquisition assistance data: 4 minutes

For coarse location positioning, assume each satellite gets a new sub-almanac during the shift. (again, very pessimistic; this would only occur if the user had not performed an LCS session during the previous 3 to 20 weeks)

The comparable downlink bandwidth used in this scenario is:

TABLE 2

| Number of Satellites in the solution | Total Assistance Bits Using Acquisition Assistance | Total Assistance Bits Using Coarse Location Positioning |
| --- | --- | --- |
| 4 | 451,800 | 11,490 |
| 6 | 653,400 | 17,130 |
| 8 | 855,000 | 22,770 |

Various embodiments of the invention have been described with reference to the figures, equations, and tables, none of which are intended to be limiting. Within the scope of the invention, as claimed below, are multiple alternatives not specifically described. For example, the order of operations in the illustrated methods may be changed without departing from the scope of the invention. In addition, the components and their respective functions as shown may be rearranged or reassigned without departing from the scope of the invention.

What is claimed is:

1. A satellite based positioning method including a mobile station and a network, the method comprising:
   acquiring, by the mobile station, a plurality of satellites using stored satellite sub-almanacs;
   calculating, by the mobile station, a coarse position of the mobile station using the sub-almanacs;
   transmitting from the mobile station to a network the coarse position and a list of satellites and their respective sub-almanacs used to calculate the coarse position; and
   calculating and transmitting from the network to the mobile station, a corrected coarse position based on a difference between the sub-almanacs of the listed satellites and corresponding ephemeris data of the listed satellites.

2. The method of claim 1, including:
   storing, by the mobile station, the coarse position, and
   transmitting, by the mobile station, the coarse position to the network after a period of time.

3. The method of claim 1, further comprising:
   calculating, by the network, a correction to the coarse position; and
   transmitting, by the network, the correction to the mobile station.

4. The method of claim 1, further comprising:
   determining, by the network, whether any of the sub-almanacs require replacement; and
   transmitting, by the network, the required replacement sub-almanacs to the mobile station.

5. The method of claim 4, further comprising:
   transmitting, by the mobile station, an indication of an acceptable level of error to the network, wherein determining whether any of the sub-almanacs requires replacement includes determining whether the acceptable level of error has been exceeded.

6. The method of claim 1, further comprising:
   receiving, by the mobile station, a reference position; and
   calculating, by the mobile station, the coarse position using the reference position.

7. The method of claim 6, wherein the mobile station transmitting the coarse position comprises transmitting a position difference between the reference position and the coarse position.

8. The method of claim 3, further comprising:
   transmitting, by the mobile station, an identification list to the network, wherein the identification list comprises identifications of particular satellites used in calculating the coarse position, and identifications of particular sub-almanacs for each of the particular satellites.

9. The method of claim 8, wherein calculating the correction comprises calculating a position correction vector over satellites used to calculate the coarse position.

10. The method of claim 8, wherein calculating the correction comprises calculating a pseudorange correction for each satellite used to calculate the coarse position.

11. The method of claim 8, wherein calculating the correction comprises calculating a differential correction, wherein the differential correction accounts for discrepancies between calculation results obtained using ephemeris data and pseudorange data observed by a reference receiver at a known location.

12. A method of determining a position of a mobile station, the method comprising:
    storing, by the mobile station, sub-almanac data;
    calculating, by the mobile station, a coarse position of the mobile station using the sub-almanac data;
    transmitting, by the mobile station, the coarse position and an identification list to a network, wherein the identification list comprises identifications of particular satellites used in calculating the coarse position, and identifications of particular sub-almanacs for each of the particular satellites;
    calculating, by the network, an estimated range error per satellite; and
    if the estimated range error exceeds a predetermined threshold for particular sub-almanacs, transmitting, by the network, replacement sub-almanacs to the mobile station.

13. The method of claim 12, further comprising, if the estimated range error does not exceed the predetermined threshold for any of the sub-almanacs, calculating a final position solution for the mobile station.

14. The method of claim 12, further comprising:
    re-transmitting a position request to the mobile station; and
    the mobile station recalculating a coarse position using the replacement sub-almanacs.

15. A satellite based positioning method for a mobile station in communication with a network, the method comprising:
    transmitting, by the mobile station, an identification list comprising identifications of particular satellites thought to be in view, and identifications of particular sub-almanacs for each of the particular satellites;
    estimating, by the network, range errors for each of the particular sub-almanacs;
    transmitting, by the network, replacement sub-almanacs to the mobile station for each sub-almanac for which a predetermined range error threshold is exceeded; and
    calculating, by the mobile station, a coarse position using the sub-almanacs including any replacement sub-almanacs.

16. The method of claim 15, further comprising:
    transmitting, by the mobile station, the coarse position and a new identification list to the network; and
    calculating, by the network, a final position solution for the mobile station.

17. A satellite based positioning method for a mobile station in communication with a network, the method comprising:
    calculating, by the mobile station, which particular satellites the mobile station tracks;
    determining, by the mobile station, whether any sub-almanacs associated with the particular satellites are older than a predetermined maximum age;
    if one or more of the sub-almanacs are older than the predetermined age, transmitting, by the mobile station, to the network an identification list and an error threshold, wherein the identification list comprises identifications of particular satellites thought to be in view, and identifications of particular sub-almanacs for each of the particular satellites;
    estimating, by the network, range errors for each of the particular satellites; and
    transmitting, by the network, replacement sub-almanacs for any satellites for which the range error exceeds the error threshold.

18. The method of claim 17, further comprising:
    acquiring, by the mobile station, satellites and taking measurements by using stored data and replacement sub-almanacs.

19. The method of claim 18, further comprising:
calculating, by the mobile station, a coarse position;
transmitting, by the mobile station, the coarse position and an identification list to the network; and
calculating, by the network, a final position solution for the mobile station.

20. A machine-readable medium having instructions stored thereon, which when executed cause a processor in a mobile station to perform a satellite positioning process, wherein the process comprises:
acquiring, by the mobile station, a plurality of satellites using stored satellite sub-almanacs;
calculating, by the mobile station, a coarse position of a mobile station using the sub-almanacs;
transmitting from the mobile station to a network the coarse position and a list of satellites and their respective sub-almanacs used to calculate the coarse position; and
calculating and transmitting from the network to the mobile station, a corrected coarse position based on a difference between the sub-almanacs of the listed satellites and corresponding ephemeris data of the listed satellites.

21. The machine-readable medium of claim 20, wherein the process further comprises storing the coarse position, and transmitting the coarse position to the network after a period of time.

22. The machine-readable medium of claim 20, wherein the process further comprises:
calculating a correction to the coarse position; and
transmitting the correction to the mobile station.

23. The machine-readable medium of claim 20, wherein the process further comprises:
determining whether any of the sub-almanacs require replacement; and
transmitting and required replacement sub-almanacs to the mobile station.

24. The machine-readable medium of claim 23, wherein the process further comprises transmitting an indication of an acceptable level of error to the network, wherein determining whether any of the sub-almanacs require replacement includes determining whether the acceptable level of error has been exceeded.

25. The machine-readable medium of claim 20 wherein the process further comprises:
receiving a reference position; and
using the reference position to calculate the coarse position.

26. The machine-readable medium of claim 25, wherein transmitting the coarse position comprises transmitting a position difference between the reference position and the coarse position.

27. The machine-readable medium of claim 22, wherein the process further comprises transmitting an identification list to the network, wherein the identification list comprises identifications of particular satellites used in calculating the coarse position, and identification of particular sub-almanacs for each of the particular satellites.

28. The machine-readable medium of claim 27, wherein calculating the correction comprises calculating a position correction vector over satellites used to calculate the coarse position.

29. The machine-readable medium of claim 27, wherein calculating the correction comprises calculating a pseudorange correction for each satellite used to calculate the coarse position.

30. The machine-readable medium of claim 27, wherein calculating the correction comprises calculating a differential correction, wherein the differential correction accounts for discrepancies between calculation results obtained using ephemeris data and pseudorange data observed by a reference receiver at a known location.

* * * * *